Dec. 12, 1933.   H. L. BERMAN   1,938,736
POINSETTIA
Filed March 24, 1933
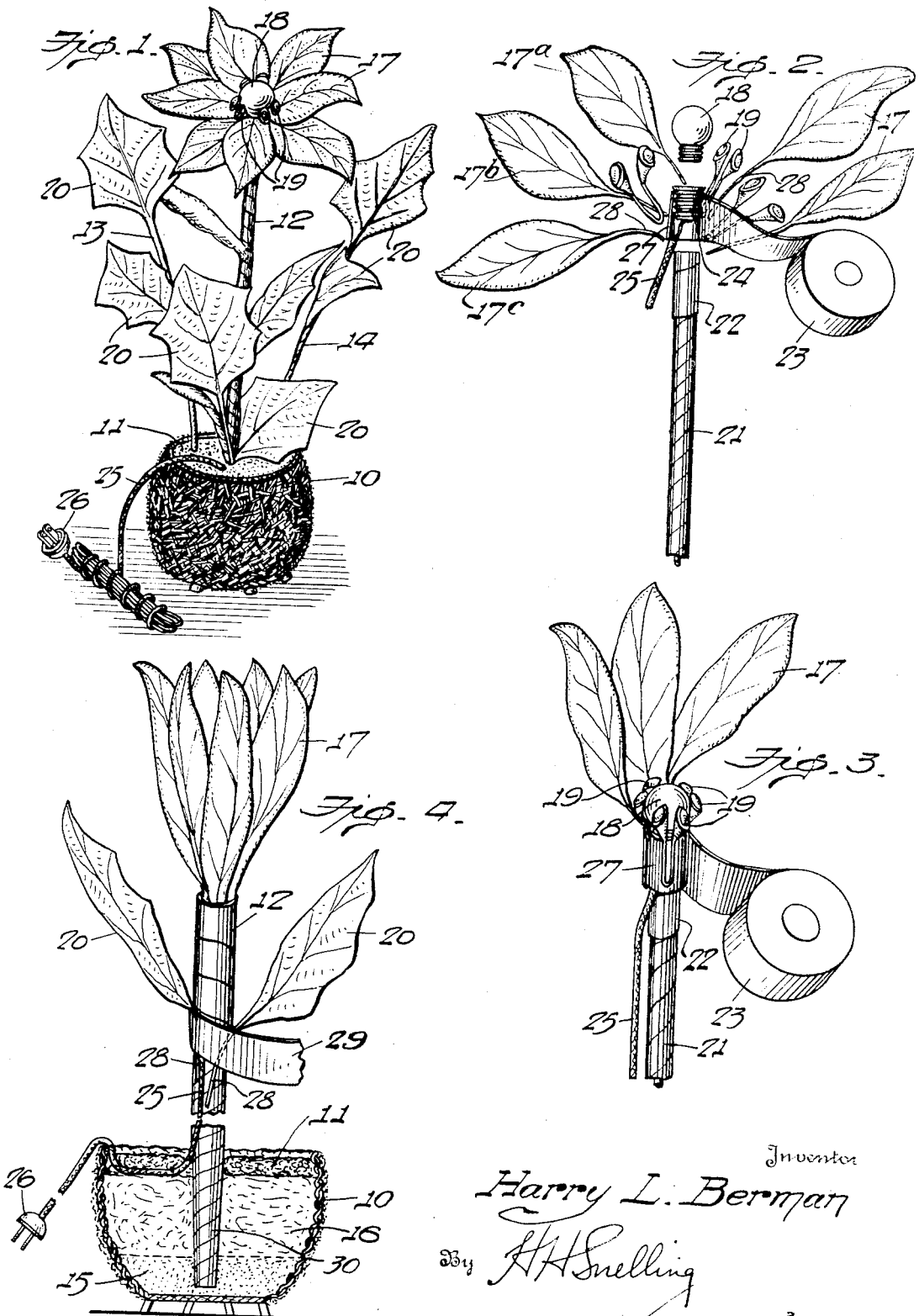
Inventor
Harry L. Berman
By H H Snelling
Attorney Patented Dec. 12, 1933

1,938,736

UNITED STATES PATENT OFFICE 1,938,736

POINSETTIA

Harry L. Berman, Baltimore, Md., assignor to American Decorative Flower Co. Inc., Baltimore, Md., a corporation of Maryland Application March 24, 1933. Serial No. 662,621

3 Claims. (Cl. 240—10)

This invention relates to illuminated artificial flowers and the method of making the same. The particular object of the invention is to simplify the manufacture of poinsettias and to produce at a relatively low cost an illuminated flower that is more brilliant than the natural bloom and one that has the additional advantage of being useful as an attractive illuminated decoration especially desirable at Christmas time.

In the drawing:—

Figure 1 is a view of a simple embodiment of the invention.

Figure 2 is a partly exploded view of the flower with the parts arranged for assembly.

Figure 3 shows the first few steps of the assembly completed.

Figure 4 shows the flower partly finished.

In order to give the flower a natural appearance, I provide a base 10 which is illustrated in its preferred form, that is, a twig flower basket, although I may use any kind of pottery, for example, an ordinary clay flower pot or even a paper flower pot. This container is filled with imitation soil represented by excelsior or artificial moss 11 which keeps the stems 12, 13 and 14 erect. The basket or pot may be weighted with sand 15 or the like, and for economy the full filling of moss can be replaced by a filling of coarse excelsior or old newspapers 16 placed on top of the sand and this filling then covered with the green moss 11, at the top.

The flower consists of from six to twelve red petals 17 arranged in overlapping position around the light bulb 18 which is preferably colored red; between the bulb and the petals are the stamens 19. The leaves 20 are positioned along the stems 12, 13 and 14 in sessile alternate formation as is natural with the poinsettia. Although I have illustrated a single flower stem, it is obvious that any number may be used and also any amount of foliage may be used depending on the effect and amount of color desired.

My method of making the flower is as follows: For the main stem or stalk I use a piece of relatively stiff paper covered wire 21 which I cap with a single turn 22 of adhesive insulating tape 23 and over this place an electric light socket 24 to which is attached in the usual manner the duplex cord 25 having on its lower end a plug 26 for connecting with an ordinary plug outlet. The socket is held in position by a turn 27 of the tape which tape is preferably slightly sticky on the outside as is common with the well known tire or friction tape. This sticky surface assists greatly in holding the first few stamens 19 and leaves 17 in place while the others are being positioned and while a second layer of tape is applied over the stems so held as shown in Figure 3.

Four or five petals 17 may be held in position by the same layer of tape used to secure the stamens in place, thus making the calix less bulky or alternatively all the petals may be attached after the stamens are in place by applying their stems 28 to the second layer and covering with a third turn, it being understood that the tape is not cut until all the petals are attached or it even may be continued to the end of the stalk 21 if the leaves are placed thereon as the winding takes place. However, in order to save time as well as tape, I prefer to attach the leaves by a covering of crepe paper 29 which not only hides the friction tape at the calix but also binds the duplex conductor cord 25 to the wire 21. The paper is preferably applied in the same manner as the tape, i. e., by wrapping a narrow strip of it around the stalk in an overlapping helix as shown in Figure 4. Since the leaf stems 28 are relatively long the several turns of crepe paper hold the leaves securely to the stalk especially since the paper is resilient and therefore it is unnecessary to use a turn of friction tape for this purpose.

The sticky surface of the friction tape at the calix serves the additional function of holding the crepe paper firmly in place at the start so that no gluing or other fastening means is necessary. In fact the crepe paper itself is so resilient that two or three turns will hold the entire flower together without the use of any friction tape but where the tape is dispensed with I use a layer of corn husk to insulate the socket; the rough surface of the husk aids in holding the parts in place while the crepe paper is applied.

In the natural flower the petals are of different sizes and I prefer to maintain this characteristic by providing three sizes of petals as shown in Figure 2; the smaller petals 17a are preferably placed on with the stamens 19, then the intermediate size 17b are attached and finally on the outside are placed the large petals 17c.

If the flowers are to be shipped to branch stores or shops the leaves and petals are left lying as wrapped, i. e., parallel along the stem, since in this form they take up less room and are much less likely to be damaged when packed in large bundles. But if the flower is to be sold to local trade the leaves and petals are bent to their natural position, i.e., about normal to the stalk, as soon as the crepe paper is applied. The lower unwrapped end of the stalk 30 is thrust into the excelsior 16, the cord 25 is pushed down against the latter and then a covering of green moss 11 is laid over all so that every portion of the article has a natural appearance.

What I claim is:

1. The method of making an illuminated artificial flower which consists in covering the top portion of an electrically wired stem and a lamp socket at the top thereof with a turn of friction insulating tape, pressing a number of stamen stems against said tape whereby the stamens are held in position, continuing the tape a second turn, sticking the stems of a plurality of petals to the second turn and then continuing the tape a third turn and finally covering the third turn and the rest of the stem with an overlapping helix of crepe paper.

2. An illuminated flower comprising a stem, a socket on the end of the stem, a pair of conductors connected to the socket and lying along the stem, means for holding the socket in position and for holding the conductors against the stem, said means having a sticky outer surface, a series of petals distributed around the socket and having their stems held by said surface, means holding the stems against said surface and a connector on the free end of said cord.

3. The method of making an illuminated artificial flower which consists in placing a bare lamp socket at the top of a stem, said socket having a pair of electrical conductors connected thereto, arranging said conductors along said stem, wrapping a turn of friction insulating tape around said socket, the top of the stem, and a portion of the conductors to thereby insulate the socket and secure it to the stem, pressing a number of stamen stems against said turn of tape whereby the stamens are held in position around the socket, continuing said tape a second turn over said stamen stems, sticking the stems of a plurality of petals to said second turn of tape and then continuing the tape a third turn to cover the petal stems and finally covering the third turn and a portion of the stem and conductors with an overlapping helix of crepe paper.

HARRY L. BERMAN.